United States Patent Office 2,734,239
Patented Feb. 14, 1956

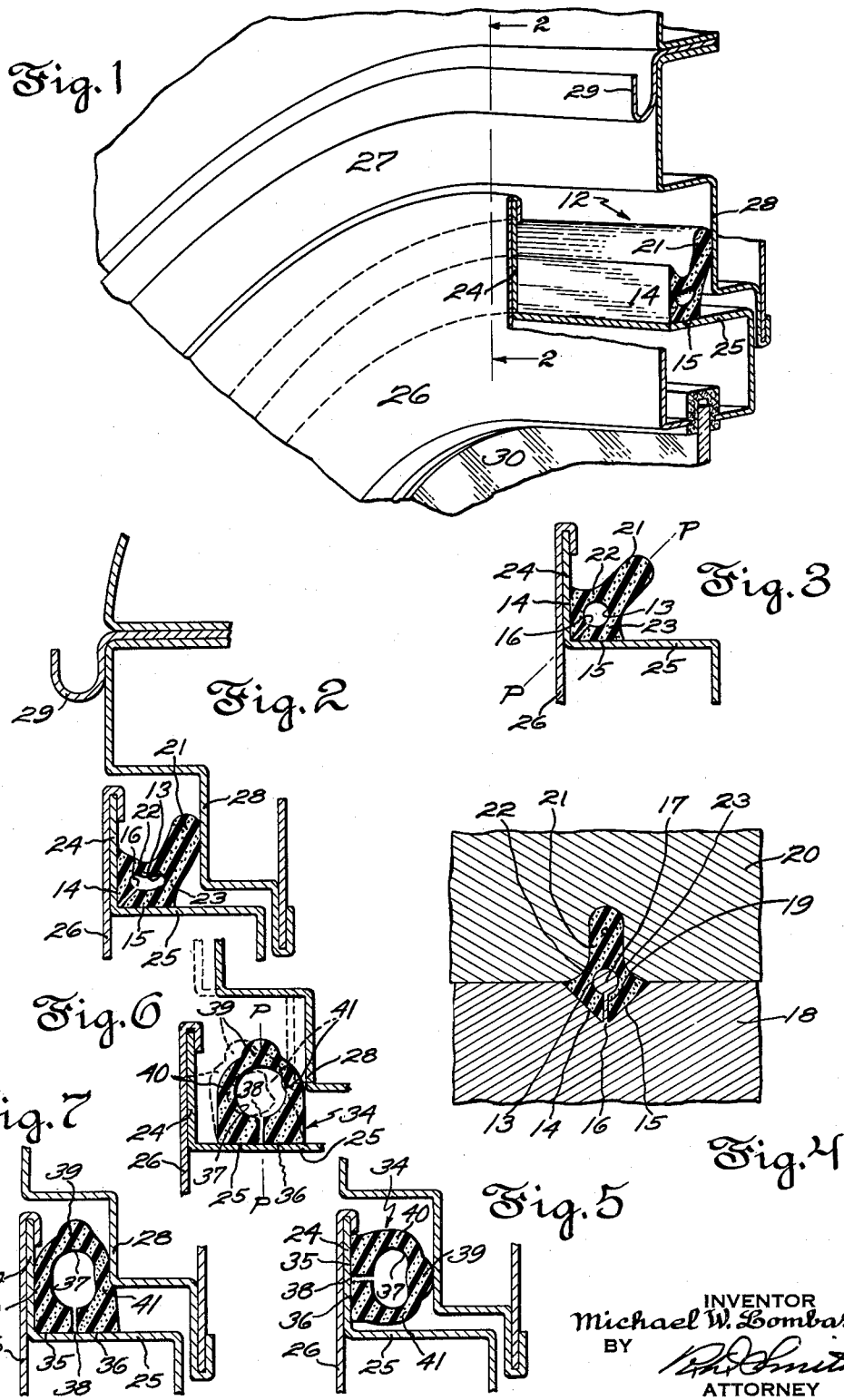

2,734,239
HOLLOW RESILIENT STRIP FOR SEALING CLOSURE JOINTS

Michael W. Lombardi, Derby, Conn., assignor, by mesne assignments, to The B. F. Goodrich Company, Akron, Ohio, a corporation of Ohio Application March 17, 1953, Serial No. 342,909

8 Claims. (Cl. 20—69)

This invention relates to closure seals in the nature of running lengths or strips of resilient sponge rubber used to seal a joint between jamb and closure structures about a door opening as for heat insulating refrigerators or weatherproofing automobiles. The cross sectional or profile shape of the strip is usually uniform throughout its length. Such strips may be made of cellular rubber or of various rubber-like cellular materials such as the softer and resilient grades of expanded plastics.

A general object of the present improvement is to increase the durability of weather strips in service and to improve their effectiveness as a seal for closure joints.

A further object is to improve the uniformity of weatherstrips when mass produced by molding methods, as distinguished from extrusion of the strip material, while at the same time reducing the quantity of material required by simplifying the profile shape of a weatherstrip that is adequate to produce a satisfactory closure seal.

A particular object is to insure more uniform, speedy and better controlled curing of sponge rubber compound as it is expanded and vulcanized into a continuous unlimited length of strip within cavities joined end-to-end that may be formed by continually traveling mutually abutting mold sections.

These and related objects will appear in fuller particular in the following description of successful ways of practising the invention, such description having reference to the accompanying drawings wherein:

Fig. 1 is a fragmentary perspective view of the marginal portion of a door when in closed relation to its jamb in the body of an automobile, both the door and jamb being broken away to expose the location and flexed condition of a joint sealing strip embodying the invention and here used as a weatherstrip.

Fig. 2 is a view taken in section on a plane 2—2 in Fig. 1 normal to the door surface looking in the direction of the arrows.

Fig. 3 shows in transverse section the normal undistorted profile shape of the sealing strip mounted on the door.

Fig. 4 shows the cross sectional shape of the strip of Fig. 3 before its removal from a continuous extent of cavities in end-to-end traveling mold sections in which its raw material has been expanded and cured or vulcanized.

Figs. 5, 6 and 7 show a modified shape of weather strip so variously mounted in place of strip 12 that when subjected to external thrust in differing directions such thrust is borne by the resilient resistance to flexing of a plurality of tubular side walls of the strip simultaneously.

It has been proposed heretofore to provide sealing strips with holes running lengthwise therethrough in a manner to make the strip hollow or of tubular nature, but such strips have been of complicated, material wasting, unsymmetrical shapes or have undesirably been prestretched by their method of production or mounting for use. As one result such strips have been limited to some single mounting arrangement between a jamb and a closure of specified constructions.

A strip made and shaped according to this invention is susceptible of being mounted on a variety of constructions of doors and door jambs in a choice of positions and is capable of performing a satisfactory sealing function while accommodating external thrust applied thereto in widely differing directions at various points on its external surface. Under all such conditions the thrust against the strip according to these improvements will mainly be borne by simultaneous resistance to flexure of a plurality of tubular side walls of the strip.

One shape which my improved sponge rubber strip may take is shown in Figs. 1 to 4, inclusive, wherein the strip 12 is free from any enforced initial stress or stretch because its profile shape when mounted for use is exactly the same as that to which the sponge rubber compound or other swellable material has been expanded and vulcanized in the mold cavity of Fig. 4. This profile shape is uniform throughout the length of the strip and it is symmetrical with respect to a reference plane P extending longitudinally central of the strip.

Forming oblique angles with such plane there is a flat mounting surface 14 on the mounting portion of the strip. This may be supplemented by another obliquely disposed mounting surface 15 on the same portion of the strip.

The mounting portion of the strip contains a channel of keyhole shape whose relatively wide portion 13 affords a strip hollowing hole that is continuous lengthwise of the strip and whose relatively narrow portion 16 affords a crevice also continuous lengthwise of the strip opening outward of the strip at said mounting surface 14 or 15. If the relatively divergent mounting surfaces 14 and 15 be regarded as a continuous extent of mounting surface, crevice 16 can be said to open through such mounting surface. A thin body of conventional adhesive substance for bonding rubber to metal intervenes between and is bonded to the mounting surfaces 14, 15 or 35, 36 and the strip supporting surface of walls 24 and/or 25 and extends into the crevice 16 or 38 wherefore to strengthen the cling of the joint sealing strip to such supporting surface. The adhesive may be a suitable rubber cement.

Crevice 16 divides and permits temporary spreading apart of the two sides of the mounting portion of the strip to permit its separation from the core bead 17 in Fig. 4. This core bead forms a fixed part projecting from the lower metallic mold section 18. After the sponge rubber or other cellular plastic has been expanded to surround the core bead and completely fill the mold cavity and then vulcanized into permanent shape, the finished article can be stripped from the lower mold section 18 because of the compressibility and flexibility of the sponge rubber. The narrow crevice 16 is formed in the mounting portion of the strip by the thin upstanding metallic web 19 that supports the core bead 17 from the main body of the mold section.

The upper mold section 20 contains a cavity that determines the shape of two yieldable tubular walls 22, 23 that flank opposite sides of hole 13 and join each other at a point remote from crevice 16. Walls 22 and 23 are of less minimum thickness than the extent of hole 13 along the reference plane P—P in Figs. 3 and 6. At the meeting point of walls 22, 23 there is formed a lip 21 that projects outwardly from hole 13 in a direction away from crevice 16 and away from the mounting surfaces 14, 15.

In Fig. 2 lip 21 is shown as having yielded to a thrust of cantilever nature by causing tubular wall 22 to bow inward of hole 13 and causing tubular side wall 23 simultaneously to bow outward with respect to hole 13. Thus the distorted shape is inflicted on the strip that is shown in Figs. 1 and 2, its mounting surfaces 14 and 15 remaining firmly secured or bonded as by adhesive cement to the angularly related supporting walls 24, 25 respectively of a closure such as an automobile door 26. The sheet metal structure of the frame or casing of a doorway in an automobile body 27 provides a jamb 28 against which the lip 21 of the weatherstrip is adapted to be pressed by closing of the door. The overhanging gutter 29 is a characteristic feature of automobile bodies located above door openings provided with closure seals. The sealing strip 12 acts as a soft shock absorptive bumper tending to protect window glass 30 from being broken by excessive jar in closing of the door.

In Fig. 5 there is shown a modified profile shape of weatherstrip 34 embodying the present improvements. Here the flat mounting surfaces 35, 36 of the strip are coplanar instead of angularly divergent as in Fig. 3. The hole 37 and crevice 38 of the keyhole-shaped channel are generally similar to the corresponding shape of channel in Fig. 3, and the crevice 38 opens through the coplanar mounting surfaces 35—36. The hole 37 is flanked by opposite tubular side walls 40, 41. The lip 39 is relatively shorter than lip 21 in Fig. 3.

Fig. 5 shows a strip of this modified shape mounted so as to present the lip 39 "head on" so as to nose directly straightway against the jamb surface 28. The whole of the mounting surface 35, 36 is securely bonded by adhesive to the single sheet metal wall surface 24 of the door. The direct thrust that results on lip 39 exerts on the strip as a whole a squeezing force of compressional nature but this becomes converted into a flexure causing force of cantilever nature at the tubular walls 40, 41 which causes their deflection from their normal mold produced shape in Fig. 6 to the deformed shape of these walls and of hole 37 shown in Fig. 5. Here both side walls bow simultaneously outward with respect to the hole like the side walls of a partially flat tire, while the meeting region of the side walls at the lip 39 is forced to bow inward with respect to channel hole 37.

In Fig. 6 the whole of the mounting surface 35, 36 of the strip is cemented to the single sheet-metal edge wall 25 of the door so that upon being subjected to the thrust of the jamb the strip distorts by swaying laterally toward the left into its deflected position represented by broken lines.

In Fig. 7 a strip like that in Figs. 5 and 6 is mounted firmly in the corner so as to have the combined support of door walls 24 and 25. The strip distortion under these circumstances becomes that illustrated in Fig. 7. Only the side wall 41 of the strip has been caused to bow inwardly of the hole 19 while the region of the side walls at the lip 39 has been forced to bow outwardly with respect to such hole.

In Figs. 2, 5, 6 and 7 it will be observed that no single web of material is depended upon to withstand the fatigue of flexing in service but that there are always two cooperative side walls partaking of the duty of yieldably resisting flexure whereby longer life in service is imparted to the strip. Also since the two flat mounting surfaces, such as 14, 15 or 35, 36 are separated by the crevice 16 or 38, if one of such surfaces starts to peel off or tear loose from the door surface to which it is cemented, the peeling off will not be continuous and thus not communicated nor transmitted to the other mounting surface because of the intervening position of the crevice.

The making of hollow weather strip of sponge rubber in such shapes as herein newly proposed presents troublesome problems that are not encountered in making weather strip of solid rubber because the latter can be produced by merely extruding and then vulcanizing the cross sectional shape of strip. Sponge rubber on the other hand must be expanded to its ultimate shape in a mold. The fixed core rod 17 of Fig. 4 serves as a permanent part of the improved form of mold wherefore to form the channel 13, 16 or 37, 38. The uniformity of application of vulcanizing heat is thereby benefited by the ready conductance of the heat of the mold through the rigid web 16. Such web may be made as an insert embedded in and projecting from mold section 18. This carrying of heat to the hollow of the strip and radiating the heat directly against the inside surface of the channel walls speeds up the curing process and produces an important increase in controlled uniformity of the density, softness and size of cells.

All departures from the exact shapes and relationships of parts disclosed herein which fall within a broad interpretation of the terms used to define the invention in the appended claims come within the intended meaning of the language of the claims.

I claim:

1. A strip for sealing a joint between jamb and closure structures, comprising, an elongate body composed of resilient unstretched minutely cellular material having a cross sectional shape delineating a mounting portion of the strip having an extent of mounting surface adapted to be secured to one of said structures and containing a channel extending lengthwise of the strip, said channel having a portion of relatively spacious cross section affording a strip hollowing hole and a relatively narrow portion affording a crevice aligned with a reference plane intersecting said hole and opening outward from said hole through said mounting surface, said hole being flanked on each of opposite sides thereof by limber tubular walls of said material of less minimum thickness than the extent of said hole along said plane mutually joined at a side of said hole most remote from said crevice.

2. A sealing strip as defined in claim 1, in which there are two flat mounting surfaces on the said mounting portion of the strip at respectively opposite sides of the said crevice.

3. A sealing strip as defined in claim 1, in which there are two coplaner flat mounting surfaces on the said mounting portions of the strip at respectively opposite sides of the said crevice, wherefore detachment of one of said mounting surfaces from its means of support will not tend to cause detachment therefrom of the mounting surface on the other side of said crevice.

4. A sealing strip as defined in claim 1, in which there are two angularly related flat mounting surfaces on the said mounting portion of the strip at respectively opposite sides of the said crevice, wherefore detachment of one of said surfaces from its means of support will not tend to cause detachment therefrom of the mounting surface on the other side of said crevice.

5. A sealing strip as defined in claim 1, together with a lip coextensive with the length of the strip projecting outwardly from the said hole along the said reference plane at the point of joindure of the said tubular walls.

6. A sealing strip as defined in claim 5, in which the said lip is integral and homogeneous with the said tubular walls.

7. A sealing strip as defined in claim 5, in which the said lip is sufficiently elongated in the direction in which the said reference plane extends to enable said lip to be flexed out of line with said plane by forces applied laterally to said lip.

8. A sealing strip as defined in claim 1, in which there are two mounting surfaces on the said mounting portion of the strip at respectively opposite sides of the said crevice, together with a support surface on one of the said structures conforming to said two mounting surfaces, and a body of adhesive substance bonded to an intervening between said support surface and said mounting surfaces and extending into the said crevice wherefore to strengthen the cling of the joint sealing strip to said support surface.

References Cited in the file of this patent

UNITED STATES PATENTS

| | | |
|---|---|---|
| 2,121,826 | Roberts | June 28, 1938 |
| 2,357,513 | Harmon | Sept. 5, 1944 |
| 2,599,440 | Dudley | June 3, 1952 |
| 2,612,665 | Scott | Oct. 7, 1952 |